(12) United States Patent
Stumm

(10) Patent No.: US 6,912,016 B2
(45) Date of Patent: *Jun. 28, 2005

(54) AUDIOVISUAL SYSTEM FORMED BY VARIOUS APPLIANCES OF WHICH CERTAIN APPLIANCES ARE FORMED BY VARIOUS FUNCTIONALITY MODULES

(75) Inventor: Francis Stumm, Montigny les Cormeilles (FR)

(73) Assignee: Koninklijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 272 days.

(21) Appl. No.: 09/287,427

(22) Filed: Apr. 7, 1999

(65) Prior Publication Data
US 2002/0129357 A1 Sep. 12, 2002

(30) Foreign Application Priority Data
Apr. 7, 1998 (FR) .......................... 98 04319

(51) Int. Cl.$^7$ ........................ H04N 5/268
(52) U.S. Cl. ............... 348/705; 348/706; 710/110
(58) Field of Search ............... 348/705, 706, 348/522, 722; 725/80; 710/104, 105, 107, 110

(56) References Cited

U.S. PATENT DOCUMENTS

| | | | | |
|---|---|---|---|---|
| 5,574,965 A | * | 11/1996 | Welmer | 455/3.2 |
| 5,592,237 A | * | 1/1997 | Greenway et al. | 348/716 |
| 5,608,730 A | * | 3/1997 | Osakabe et al. | 370/471 |
| 5,909,559 A | * | 6/1999 | So | 395/307 |
| 5,991,842 A | * | 11/1999 | Takayama | 710/10.5 |

FOREIGN PATENT DOCUMENTS

| | | | | |
|---|---|---|---|---|
| EP | 0580211 A1 | 7/1993 | | H04B/1/20 |

* cited by examiner

*Primary Examiner*—Victor R. Kostak
(74) *Attorney, Agent, or Firm*—Daniel J. Piotroski

(57) ABSTRACT

Various appliances linked up by a bus that can transmit video data form the system, and functionality modules themselves connected to the bus form certain appliances. A command enables to select functionality modules in various appliances at a time, to command the switch-on of these modules and to establish exchanges of data between these modules. A substantially virtual appliance may thus be formed by the combination of functionality modules that are found in separate appliances.

11 Claims, 1 Drawing Sheet

AUDIOVISUAL SYSTEM FORMED BY VARIOUS APPLIANCES OF WHICH CERTAIN APPLIANCES ARE FORMED BY VARIOUS FUNCTIONALITY MODULES

BACKGROUND OF THE INVENTION

The present invention relates to an audiovisual system formed by various appliances of which certain appliances are formed by various functionality modules and are linked up by a bus, at least one of these appliances having a processor and receiving means for receiving commands from a user.

The invention also relates to an appliance intended to be part of an audiovisual system formed by various appliances of which certain appliances are formed by various functionality modules, the appliance including means for sending/receiving data over a bus, a processor and receiving means for receiving commands from a user.

The system as defined in the opening paragraph above is known from the document EP-A-0 580 211. According to this document, a domestic system comprises a plurality of separate appliances interconnected by a control network, and one of the appliances called hub appliance has actuators such as buttons which enable to activate whichever of the appliances from the hub appliance.

It is an object of the invention to augment the possibilities of such a system.

For this purpose, with the bus being capable of transmitting video data, the processor includes means for interpreting a command to combine modules and to select, in response to such a command, functionality modules in various appliances at a time, to command the switch-on of these modules and to establish data exchanges between these modules.

SUMMARY OF THE INVENTION

The invention is thus based on the idea of forming a substantially virtual appliance by the association of functionality modules that are found in separate appliances.

Particular embodiments will appear in the dependent claims 2 to 8.

In an appliance for which the bus is of a model that can transmit video data, the processor includes means for receiving a command from a user requesting the processor to execute a particular function that implies the association of various functionality modules in separate appliances and means for sending over the bus, in response to such a command, selection commands of said modules, commands to switch-on these modules and commands to establish data exchanges between these modules.

These and other aspects of the invention are apparent from and will be elucidated, by way of non-limitative example, with reference to the embodiments described hereinafter.

In the drawings:

DETAILED DESCRIPTION OF THE PREFERRED EMBODIMENTS

Figure 1:
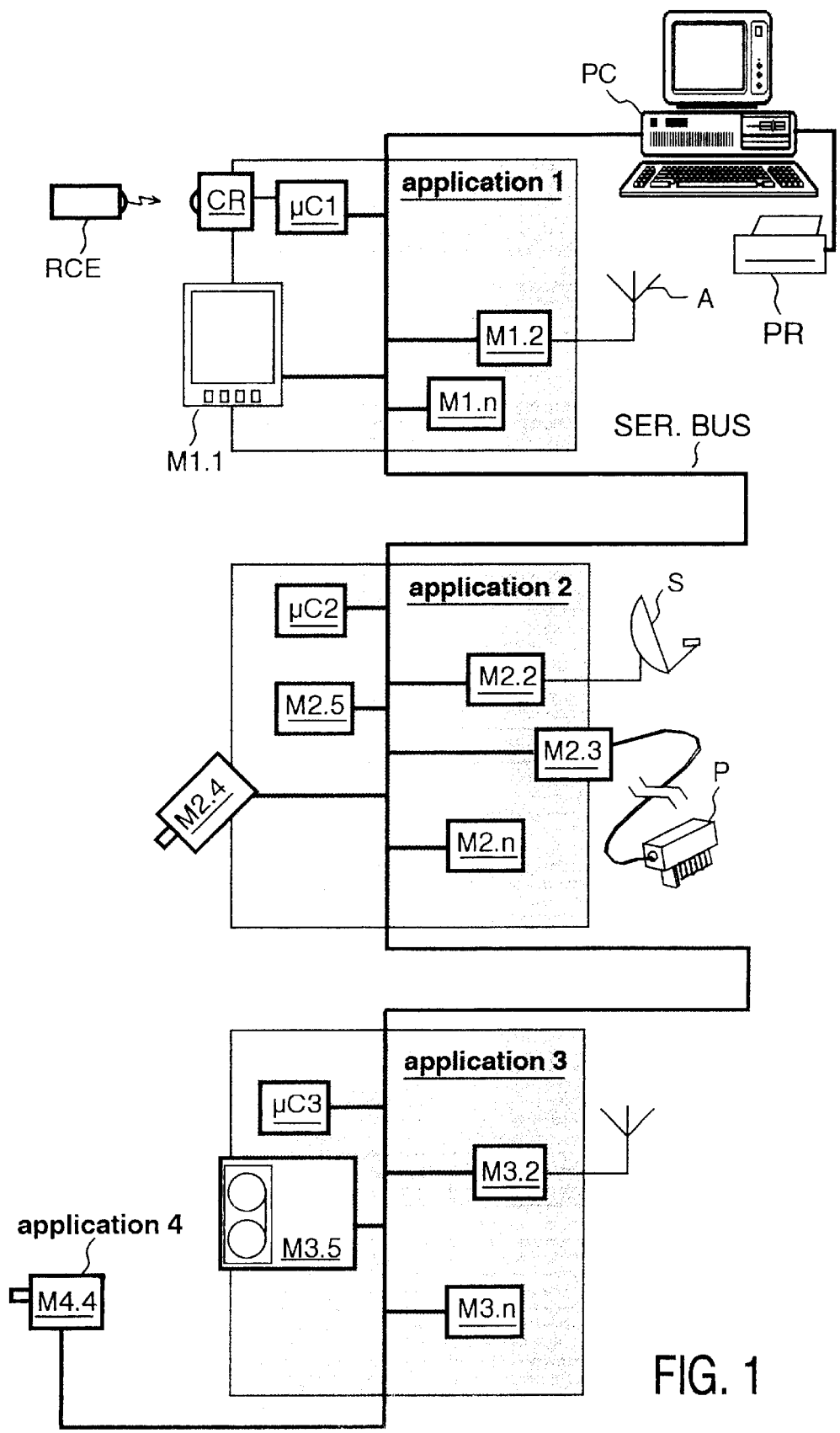
FIG. 1 diagrammatically represents an audiovisual system according to the invention.

The audiovisual system of FIG. 1 is formed by various appliances indicated by the term <<application>>. The appliance <<application 1>> comprises various functionality modules M1.1 to M1.n; the appliance <<application 2>> comprises various functionality modules M2.1 to M2.n, and so on. A bus SER.BUS capable of transmitting command data or information data and also video data interconnects these appliances. One or various functionality modules are linked up direct to the bus inside the appliances. This bus is, for example, a serial bus of the standardized type <<IEEE 1394>> whose rate can reach 400 Mbps.

The appliance <<application 1>> is, for example, a digital television receiver that has a processor $\mu C1$ and means for receiving commands from a user, here a system known per se as a remote control formed by a remote-control emitter RCE which emits infrared light signals, and a receiver CR itself connected to the processor $\mu C1$. The functionality module M1.1 is a graphics display; the functionality module M1.2 is a tuner that receives digital television signals via a terrestrial antenna A.

The appliance <<application 2>> is, for example, a satellite television receiver/decoder also having a processor $\mu C2$ and whose module M2.2 is a tuner that receives television signals via a satellite antenna S, the functionality module M2.5 is a decoder/descrambler and the functionality module M2.3 is a modem connected by a telephone line to a server (not shown) for managing payments of the user, for example, for watching a film.

The appliance <<application 3>> is, for example, a digital videorecorder having a processor $\mu C3$ and of which a functionality module M3.5 is a cassette read/write unit and another functionality module M3.2 is an analog tuner having an analog/digital converter.

The appliance <<application 2>> could also be, for example, a videoconference apparatus of which the functionality module M2.3 is a modem and the functionality module M2.4 is a television camera with microphone.

In the appliance <<application 3>>, the functionality module M3.5 could also be a DVD RAM or DVD RW reader/writer.

The appliance <<application 4>> is an area monitoring camera.

An appliance that has a processor can also be a personal computer connected to the audiovisual system as indicated under reference <<PC>>. It has a port for connection to the IEEE 1394 bus that links up the appliances of the system.

Each physical unit present on the bus may thus be subdivided into various sub-units or autonomous functionality modules. The moment a functionality module is linked to the digital bus, it becomes available to the other modules, even if the latter are located in different appliances.

In the appliance <<application 1>>, the processor $\mu C1$ includes means, that is to say, software, for interpreting a command received from the user via the elements RCE and CR, and requesting a combination of the modules. In response to such a command, the processor selects functionality modules in various appliances at a time, it controls the switch-on of these modules and the establishing of data exchanges between these modules so as to realize the requested virtual appliance. Such a combination would not be possible without the bus.

Such a request may be of a variety of types, for example:
combine the printer PR of the computer PC with a modem M2.3 of the appliance <<application 2>> to form a facsimile machine, without the computer,
combine the graphics display M1.1 of the appliance <<application 1>> with the modem M2.3 of the appliance <<application 2>> to form a <<Minitel>>, or an Internet Surfer, combine the modem M2.3 with the recorder M3.5 to purchase CD-ROMs on the <<Internet>> and record them locally, combine the modules M2.2, M2.5 and M3.5 to receive and descramble transmissions and record them, combine the analog tuner module M3.2 having an analog/digital converter with the recorder M3.5 to write analog transmissions on the DVD, combine various cameras such as M4.4 and the camera M2.4 and the modem M2.3 for a remote surveillance.

Although the product formed by these combinations is virtual, it is nevertheless necessary to execute its application somewhere. Various solutions are possible:

the main display unit M1.1 having the processor $\mu$C1 can behave as a computer and execute the application locally, any other unit can behave like a master and control the other sub-units useful for the formation of the virtual product. In this case the television is only used for the interface with the user.

Such a virtual product may be introduced in an existing appliance:

by remote-loading software via the satellite receiver, as an application of an electronic program guide, by remote-loading software via <<Internet>>, by means of a <<PC>> with its habitual means for loading programs, by means of a digital videorecorder <<application 3>>, in which a suitable cassette or a DVD-ROM is loaded.

It is evident that other possibilities than those described above are also open, for example, the module M3.2 may be a digital tuner, the appliance <<application 1>>an analog receiver in which the module M1.2 is an analog tuner combined with an analog/digital converter, the modem may be a <<DECT>> or <<GSM>> radio transmission model, it may be located in the computer, and so on.

What is claimed is:

1. An audiovisual system formed by various appliances of which certain appliances are formed by various functionality modules so as to result in a creation of a plurality of virtual appliances comprising combinations of the various functionality modules of the various appliances, wherein each virtual appliance comprises functionality modules of two or more of the various appliances and each virtual appliance functions as a single unit, wherein each virtual appliance is formed by a linking up by a bus, and wherein at least one of the various appliances, having a processor and receiving means for receiving commands from a user, including a selection command for selecting an appliance to behave like a master appliance to control the other functionality modules of the plurality of the virtual appliances during formation of a particular virtual appliance, wherein the processor includes means for association of select functionality modules in two or more of said appliances to result in creating one of the particular virtual appliance.

2. An audiovisual system as claimed in claim 1, characterized in that one of the appliances having a processor is a personal computer that has a port for connection to the bus that links up the appliances.

3. An audiovisual system as claimed in claim 1, characterized in that one of the appliances is a digital television receiver of which one functionality module is a graphics display, and another functionality module is a tuner for terrestrial television reception.

4. An audiovisual system as claimed in claim 1, characterized in that one of the appliances is a satellite television receiver of which one functionality module is a descrambler and another functionality module is a modem for managing payments by a user.

5. An audiovisual system as claimed in claim 1, characterized in that one of the appliances is a DVD RAM or DVD RW reader/writer.

6. An audiovisual system as claimed in claim 1, characterized in that one of the appliances is a digital videorecorder of which one functionality module is a digital cassette or DVD read/write unit and another functionality module is an analog tuner with an analog/digital converter.

7. An audiovisual system as claimed in claim 1, characterized in that one of the appliances is a videoconference appliance of which one functionality module is a modem and another functionality module is a television camera with a microphone.

8. An audiovisual system as claimed in claim 7, characterized in that one of the appliances is an area monitoring camera.

9. An appliance comprised of an audiovisual system formed by various appliances of which certain appliances are formed by various functionality modules, the appliances including, means for sending/receiving data over a bus, a processor and means for receiving commands from a user, wherein the processor includes means for receiving from a user a command that requests the processor to execute a particular function that implies the combination of various functionality modules in separate appliances, and means for applying over the bus, in response to such a command, forming a virtual appliance by an association of select functionality modules in two or more of said appliances;

wherein each particular virtual appliance is formed by a linking up on the bus, and wherein at least one of the functionality modules in said two or more appliances comprises a processor and receiving means for receiving commands from a user, including a selection command for selecting an appliance to behave like a master appliance to control other functionality modules of the virtual appliances during formation of a particular virtual appliance.

10. An audiovisual system comprising:

a plurality of appliances, each appliance including at least one functionality module, and at least one of said appliances having a processor and receiving means for receiving commands from a user; and a bus for coupling said appliances;

wherein, the processor, responsive to a command, including a selection command for selecting an appliance to control as a master appliance the other functionality modules of the plurality of virtual appliances during formation of a virtual appliance by combining selected functionality modules of two or more appliances, and enabling the coordinated operation of said selected modules.

11. An appliance for use in an audiovisual system, said appliance comprising:

a processor having at least one functionality module, means for sending/receiving data over a bus, means for receiver commands from a user;

wherein, said processor, responsive to a command, including a selection command for selecting an appliance to control as a master appliance the other functionality modules of the plurality of virtual appliances and to execute a particular appliance, allows, over the data bus, forming a virtual appliance by the association of select functionality modules in two or more of said appliances to execute said particular function.

* * * * *